3,248,286
ANTIMICROBIAL AGENT
John D. Douros, Jr., Fanwood, N.J., and Edward J. McNelis, Wallingford, Pa., assignors to Sun Oil Company, Philadelphia, Pa., a corporation of New Jersey
No Drawing. Filed Oct. 7, 1963, Ser. No. 314,518
11 Claims. (Cl. 167—33)

This invention relates to a method for inhibiting the growth of microorganisms, and to antimicrobial compositions effective for this purpose. More particularly, this invention relates to 3,4-benzocoumarin which is useful as a bactericide, algaecide, and in inhibiting the growth of various yeasts.

Processes for killing or inhibiting the growth of certain microorganisms are of great utility in various phases of agriculture, industry, animal husbandry and the like, and since the inhibition or killing of one species or group of species may create an imbalance of organisms resulting in the enhanced growth of other deleterious microorganisms, it is apparent that finding an antimicrobial agent having a broad spectrum of activity against various types of microorganisms would be most desirable.

It has now been found, in accordance with the present invention, that 3,4-benzocoumarin (the delta lactone of 2'-hydroxy-2-biphenyl carboxylic acid) possesses a wide range of activity against various bacteria, yeasts, and algae, and application of this compound in very low doses results in very effective bacteriostatic or bactericidal activity against a variety of species of microorganisms falling within these classes. This compound, which is known in the art and may be prepared in accordance with the processes described in U.S. Patents 2,971,692 and 2,996,519, has not heretofore been known to have this surprisingly high activity against microorganisms.

It is found that the compositions and process of this invention are particularly effective as applied to a large number of algae, and particularly chlorophyll-containing algae, which are known to cause bad taste and odor in streams, settling tanks, industrial apparatus and the like, as well as cause clogging of lakes, pools, pipes, filters etc. with algal growth. As shown below, 3,4-benzocoumarin is effective against such species as *Scenedesmus obliquus, Chlorella vulgaris, Anabena catenula,* and *Oscillatoria borneti,* giving 100% inhibition at concentrations as low at 10 parts per million parts of water. When utilized as an algaecide, the amount of 3,4-benzocoumarin added to the water will vary depending upon such factors as the type of algae present, the nature of the body of water, i.e., flowing stream vs. small lake etc., and the inherent ability of the body of water to support algal growth. This inherent ability in turn depends upon such factors as exposure to sunlight, salinity, pH and the like. While in most cases the concentration of 3,4-benzocoumarin required to kill or inhibit the growth of all algae will vary from 10–100 p.p.m., the preferred amount is in the range of from about 50–100 p.p.m.

The 3,4-benzocoumarin can be added to the water according to conventional techniques for algaecide application. When treating a lake or other body of water which is relatively calm, the conventional procedure is to spray an aqueous solution of the algaecide over the surface of the water. For algaecides not readily soluble in water the algaecide is normally pre-dissolved in a water-miscible solvent. In the case of the 3,4-benzocoumarin, either water or ethanol may be used, while in the case of moving water, such as that in a water-treating plant, the algaecide can be added to the water in small amounts at periodic intervals.

The composition of this invention is also useful in inhibiting or killing a number of species of recognized pathogenic gram negative bacteria, both in vitro and in vivo, as for example those from such genera as Salmonella, Proteus, and Pseudomonas which are known to cause a variety of serious diseases in domestic animals. It has now been found, as shown below, that these and other microorganisms can be successfully killed or otherwise controlled by the application of 3,4-benzocoumarin in dosages as low as 10 mg. per kilogram of body weight of test animals when administered in vivo. At this level 65–70% protection is afforded, while at somewhat higher dosages 100% protection against a particular organism is readily achieved. Similar portection is likewise afforded by the topical application of 3,4-benzocoumarin admixed in a suitable medium.

In addition to the foregoing, it has been found that 3,4-benzocoumarin is also extremely effective against such yeast-like fungi as *Candida albicans* and *Saccharomyces cerevisiae.* The former organism is a known cause of such systemic fungus infections in animals, as Monilasis in poultry, while the Saccharomyces yeast can be a troublesome contaminant in certain industrial fermentations. In vivo tests shown below demonstrate that in mice this compound affords 50% protection against *C. albicans* at dosages of 10 mg. per kilogram of body weight of test animal. Equally small amounts in the range of from about 5 to 10 parts per million parts of fermentation broth can control the growth of the Saccharomyces in industrial fermentations.

Thus, the compositions and processes of this invention are not only useful for the control of bacterial and yeast-like fungal infections in such fields as veterinary medicine and the like, but also for the prevention and control of decomposition or decay of such materials as leather, fur, paper, plastics and paints and similar organic or organic-containing materials.

An important advantage of 3,4-benzocoumarin as an antibacterial and anti-yeast agent is the variety of routes by which is can be administered. Thus, for example, in veterinary use, particularly in poultry, it can be administered orally in feedstuffs either as a wet slurry or dry mix. Alternatively, it can be introduced into the drinking water so that a proper dosage is administered daily against infection or as a prophylactic measure. It may also be administered in vivo by injection, either intravenously intraperitoneally or subcutaneously, in a physiologically acceptable carrier, e.g., a saline solution or an oil such as corn oil, preferably admixed with an enzyme such as mucin or the like.

Still another way to administer this agent is topically, either as a dust or in salve-like compositions. When used as a dust, such suitable inert fine powder diluents as talc, diatomaceous earth, lime or the like may be employed. Alternatively, because of its high in vitro activity, 3,4-benzocoumarin can be formulated as a salve, emulsion, grease, oil, gel or like composition for topical administration. When formulated for this purpose, it is especially valuable in treating burns, dermatitis, absecesses, rashes and the like, particularly in domestic animals. The formulations can contain other therapeutically valuable supplements such as local anaesthetics and other medicinal substances. When used for this or other like purposes, the 3,4-benzocoumarin may be incorporated in any therapeutically acceptable carrier such as bland oils, petrolatum or like topical bases. These adjuvants comprise among many others, surface active agents, detergents, dispersing agents, solubilizing agents, stabilizers, wetting agents, thickening agents and conditioning agents generally. Through their modifying characteristics, these adjuvants facilitate handling and application and not infrequently enhance or potentiate the compositions of the invention in their inhibitory activity by mechanisms frequently not well understood.

When used for non-therapeutic application to articles subject to microbiological attack, suitable formulations may be prepared by mixing the compound with an emulsifying agent in the presence of organic solvents and then diluting it with water to form an aqueous emulsion containing the 3,4-benzocourmarin. Suitable emulsifying agents include, e.g., alkylbenzenesulfonates, polyalkene glycols, etc. Aqueous emulsions of the antimicrobial agent of this invention are also particularly suited for use as disinfectant solutions, e.g., to wash floors and walls, etc.

The following examples illustrate methods and compositions used in practicing this invention, but are not to be construed as limiting the scope thereof with respect to the compositions employed or the organisms to be subjected to the process of this invention. Likewise, the particular methods described for application of the compositions to the substrates which are to be treated to inhibit the growth of microorganisms are merely exemplary, and it will be apparent to those skilled in the art that other methods can be employed.

*Example I*

The effectiveness of 3,4-benzocoumarin as an algaecide was determined by the following tests:

Four different algae cultures were each placed in a separate flask containing Chu's medium, i.e., a dilute aqueous sugar solution as the nutrient. Ethyl alcohol was then added to each flask in an amount sufficient to give an ethyl alcohol concentration of 3% by volume. The purpose of the alcohol was to insure rapid and complete solution of the 3,4-benzocoumarin. The algae concentration in each flask was approximately $10^5$ cells per ml. of solution, including both nutrient and alcohol. The various species of algae present as indicated in Table I below are representative of the major classes of contaminant green algae.

To each flask was then added a known amount of 3,4-benzocoumarin, the amount being indicated in Table I as micrograms per ml. of solution. Since most of the solution is water the stated amounts are essentially equivalent to parts per million parts of solution. For comparative purposes, two sets of controls consisting of four samples each were prepared in the same manner as above except that just ethanol was added to one set of flasks, while no 3,4-benzocoumarin was added to the other set.

The extent to which the algae were killed was determined four days later by visual observation of the color and turbidity of the solutions in each flask and comparison with the untreated control flasks. Initially each solution had the color characteristic of the algae present therein. As the algae were killed the color disappeared due to the decrease in chlorophyll production by the algae. When all the algae were killed, the solution was colorless. Similarly, as the algae were killed the solution became less turbid; when all the algae were killed the solution was clear.

The results of the above tests were as follows:

TABLE I

| Concentration, μg./ml. | Scenedesmus obliquus | Chlorella vulgaris | Anabena Catenula | Oscillatoria borneti |
|---|---|---|---|---|
| 10 | − | ++ | + | − |
| 50 | − | + | − | − |
| 100 | − | + | − | − |
| 3% ethanol | ++ | +++ | ++ | ++ |
| None | ++++ | ++++ | +++ | +++ |

++++=No inhibition.  +=75% inhibition.
+++=25% inhibition.  −=100% inhibition.
++=50% inhibition.

It will be seen from the above data that 3,4-benzocoumarin gave 100% protection against 2 of the 4 representative species at about 10 parts per million parts of water while at 50 p.p.m. 3 of the 4 species were completely controlled while the fourth organism was 75% controlled at that dosage level.

*Example II*

The in vitro effectiveness of 3,4-benzocoumarin against bacteria and yeasts was determined by the following tests:

A loopful of each specie of a representative series of bacteria and yeasts was transferred from agar slants to 10 ml. of Trypticase Say Broth and incubated at 37° C. for 18 hours. At the end of this time the bacteria and yeast organisms were seeded into the same medium (plus 2% agar) in which the inoculum was prepared. The bacteria were seeded at 1 ml. of inoculums per 250 ml. of medium. The resultant mixture was poured into heat-resistant baking dishes at a temperature of 45° C. Analytical filter paper discs of 12 mm. diameter were used for the agar diffusion technique. Each disc was saturated with 0.08 ml. of the solubilized test compound (100 μg./disc) and placed on the surface of the hardened agar. The plates were incubated at 37° C. for 18 hours. The activity of the compounds was established by measuring the zone of inhibition in mm. The larger the size of the zone of inhibition, the more potent the anti-bacterial activity of the test compounds. Untreated controls used as a basis for comparison contained a profuse growth of bacteria.

The results of this test were as follows:

TABLE II.—ANTIMICROBIAL

| Microorganism | Zone diam. in mm. surrounding disk containing 100 μg./disk |
|---|---|
| Bacteria | |
| Proteus vulgaris | 20 |
| Salmonella typhimurium | 17 |
| Yeasts | |
| Candida albicans | 20 |
| Saccharomyces cerevisiae | 24 |

The above in vitro antimicrobial spectrum indicates the value of the above compounds for topical use in salves and ointments.

*Example III*

The in vivo effectiveness of 3,4-benzocoumarin against bacteria was determined by the following tests:

*General.*—Mice were used as the test animals. *Pseudomonas aeruginosa* was used as the test organism. Inoculation of both the organism and the 3,4-benzocoumarin was made intraperitoneally. The compound was solubilized by dissolving it in physiological saline solution (0.85%) and corn oil. The solutions also contained a 5% solution of mucin to act as a depressant to lessen the resistance of the mice, thus making the tests more stringent.

*Test procedure.*—In the first test six groups of mice were used: three groups were administrated the test organism and varying dosages of 3,4-benzocoumarin; three groups were used as controls of the various solvents used. Each group contained six mice. The animals were inoculated with a viable strain of the test organism ($10^7$ cells/ml.) and treated with the indicated single dose of 3,4-benzocoumarin after a six hour waiting period. The results, as shown in Table III below, were determined after a five-day period.

TABLE III

| Test material | Dose (mg./kg.) | Microorganism | Survivors/Total |
|---|---|---|---|
| 3,4-benzocoumarin | 30 | Pseudomonas aeruginosa | 3/6 |
| Do | 15 | Pseudomonas aeruginosa | 4/6 |
| Do | 10 | Pseudomonas aeruginosa | 2/6 |
| Do | 30 | Control | 5/6 |
| Do | 15 | do | 6/6 |
| Do | 10 | do | 6/6 |
| Corn oil mucin saline | None | do | 6/6 |
| Saline | None | do | 6/6 |
| Mucin | None | do | 6/6 |
| Corn oil | None | do | 6/6 |
| Do | None | Pseudomonas aeruginosa | 1/6 |

In the second test the same general procedures were followed except that smaller dosages were employed and the test was continued for ten days rather than five days. The results are shown in Table IV below.

TABLE IV

| Group | Mice injected with— Organisms | Mice injected with— Dose (mg./kg.) | No. of mice in group | Survivors/Total |
|---|---|---|---|---|
| 1 | $10^7$ | None | 6 | 1/6 |
| 2 | $10^7$ | 10 | 6 | 4/6 |
| 3 | $10^7$ | 25 | 6 | 2/6 |
| 4 | None | 10 | 6 | 6/6 |
| 5 | None | 25 | 6 | 6/6 |

It will be seen from the above results that the treatment with 3,4-benzocoumarin gives from 33-66% protection at dosages ranging from 10 to 25 mg. of compound per kilogram of body weight of test animal as compared to untreated controls.

*Example IV*

The in vivo effectiveness of 3,4-benzocoumarin against yeasts was determined by the following test:

The procedures of Example 3 were employed, using *Candida albicans* as the test organism, which was injected intravenously rather than intraperitoneally. The 3,4-benzocoumarin was injected after a 24-hour waiting period, and the results, as described in Table V below, were determined after a 10-day period.

TABLE V

| Group | Mice injected with— Organisms | Mice injected with— Dose (mg./kg.) | No. of mice in group | Survivors/Total |
|---|---|---|---|---|
| 1 | $10^7$ | None | 6 | 1/6 |
| 2 | $10^7$ | 10 | 6 | 3/6 |
| 3 | None | 10 | 5 | 5/5 |

As shown by the above data, 3,4-benzocoumarin gave 50% protection against *Candida albicans* at a dosage level of 10 mg. per kilogram of bodyweight as compared to untreated controls.

The invention claimed is:

1. A method of inhibiting the growth of microorganisms which comprises contacting said microorganisms with 3,4-benzocoumarin in an amount effective to inhibit the growth of said microorganisms.
2. The method of claim 1 wherein the microorganisms are bacteria.
3. The method of claim 2 wherein the bacteria are of the genus Peseudomonas.
4. The method of claim 1 wherein the microorganisms are yeasts.
5. The method of claim 4 wherein the yeast is of the genus Candida.
6. The method of claim 1 wherein the microorganisms are algae.
7. The method of claim 6 wherein the algae are selected from the genera consisting of Scenedesmus, Chlorella, Anabena, and Oscillatoria.
8. A method of combatting bacterial infection which comprises administering a bacteria-growth inhibiting amount of 3,4-benzocoumarin to an animal infected with a bacterial infection.
9. A method of combatting yeast infection which comprises administering a yeast-growth inhibiting amount of 3,4-benzocoumarin to an animal infected with a yeast infection.
10. A method of killing algae which comprises applying a toxic amount of 3,4-benzocoumarin to said algae.
11. The method according to claim 10 wherein the algae are chlorophyll-containing algae.

References Cited by the Examiner

UNITED STATES PATENTS 2,971,962   2/1961   Hawthorne et al. ____ 260—343.2
2,996,519   8/1961   Hawthorne et al. ____ 260—343.2

JULIAN S. LEVITT, *Primary Examiner.*

FRANK CACCIAPAGLIA, Jr., VERA C. CLARKE,
*Assistant Examiners.*